United States Patent
Tofano

(10) Patent No.: US 8,572,312 B2
(45) Date of Patent: Oct. 29, 2013

(54) DATA DE-DUPLICATION AND SOLID STATE MEMORY DEVICE

(76) Inventor: Jeffrey Tofano, San Jose, CA (US)

(*) Notice: Subject to any disclaimer, the term of this patent is extended or adjusted under 35 U.S.C. 154(b) by 161 days.

(21) Appl. No.: 13/373,975

(22) Filed: Dec. 7, 2011

(65) Prior Publication Data

US 2013/0151756 A1    Jun. 13, 2013

(51) Int. Cl.
  *G06F 12/00* (2006.01)
(52) U.S. Cl.
  USPC ................................................. 711/103
(58) Field of Classification Search
  None
  See application file for complete search history.

(56) References Cited

U.S. PATENT DOCUMENTS

| | | | |
|---|---|---|---|
| 2010/0223495 A1* | 9/2010 | Leppard | 714/6 |
| 2011/0213917 A1* | 9/2011 | Davis | 711/103 |

OTHER PUBLICATIONS

Berman et al., "Integrating De-duplication Write for Increased Performance and Endurance for Solid-State Drives", © 2010 IEEE, p. 1-3.*
Meister et al., "dedupv1: Improving Deduplicaiton Throughput using Solid State Devices (SSD)", © 2010 IEEE, p. 1-6.*

* cited by examiner

*Primary Examiner* — Brian Peugh

(57) ABSTRACT

Example methods and apparatus concern identifying placement and/or erasure data for a flash memory based solid state device that supports de-duplication. One example apparatus include a processor, a memory, a set of logics and an interface to connect the processor, the memory, and the set of logics. The apparatus may include an SSD placement logic configured to determine placement data for a de-duplication data set. The placement data may be based on forensic data acquired for the de-duplication data set. The apparatus may also include a write logic configured to write at least a portion of the de-duplication data set to an SSD as controlled by the placement data. The forensic data may identify, for example, the order in which sub-blocks are accessed, reference counts, access frequency, access groups, and other access information.

29 Claims, 8 Drawing Sheets

DATA DE-DUPLICATION AND SOLID STATE MEMORY DEVICE

BACKGROUND

De-duplication may be referred to as "dedupe". A dedupe data set may include, among other things, an index, a repository of sub-blocks, and re-creation information. The index may be configured to facilitate locating a stored sub-block. The re-creation information may be configured to facilitate assembling related sub-blocks into larger items (e.g., files). The repository of sub-blocks may be configured to facilitate accessing stored sub-blocks. A dedupe system creates and/or manages the data set to facilitate determining whether a sub-block under consideration is a duplicate sub-block or a unique sub-block and to facilitate reducing either the amount of duplicate data stored or the amount of duplicate data transmitted. The dedupe data set is stored on physical media on physical devices.

Different physical devices present different challenges and opportunities when supporting dedupe. For example, while a tape provides the opportunity to store extremely large amounts of data and the opportunity to perform efficient sequential input/output (i/o), tape may be challenged by seek times and thus challenged for random i/o. While a solid state device (SSD) built from, for example, flash memory, may provide the opportunity to perform efficient random input, an SSD may face challenges associated with the inability to perform random writes, page granularity for i/o, the inability to perform in-place updates, wear associated with frequently accessed areas, page writes being sequential only, and finite limits on erase/write cycles.

Thus attempts have been made to produce device specific techniques (e.g., tape-specific, SSD-specific) for supporting de-dupe. Generally these techniques have approached the issue "after the fact" (e.g., once data has already been de-duplicated) or inline (e.g., while the data is being compared to an existing data set). Generally these techniques have also approached the issue by addressing the well-known "index in RAM" issue associated with dedupe. While interesting and valuable, these approaches have been limited by when they are performed and their underlying assumptions about devices and dedupe.

For example, one conventional technique for using flash memory to support dedupe first identifies that flash memory tends to be faster than disk but slower than RAM, and that flash memory tends to be cheaper than RAM but more expensive than disk. This conventional technique also identifies that a dedupe index may not fit completely in RAM in a dedupe apparatus. Therefore, the conventional technique attempts to produce a flash "bridge" between RAM and disk that uses flash to replace disk and to support RAM while balancing cost versus speed. The bridge is used to store key-value pairs for the index in flash. The bridge migrates infrequently accessed key-value pairs to disk. The bridge attempts to reduce the RAM footprint of the index as much as possible by moving traditional index items (e.g., chunk location, chunk metadata) out of RAM and into flash. The bridge also attempts to reduce the RAM footprint of the index by not indexing every sub-block, but rather indexing only one sub-block per flash page. The bridge then uses pointers to pages of pointers to sub-blocks. Dedupe applications that use this conventional bridge may rely on hash collisions being resolvable in a small number of flash reads. While interesting and useful, this type of conventional technique appears to be focused on handling theoretical data sets rather than actual data sets about which actual data may be available.

One physical medium and device on which a dedupe data set may be stored is random access memory (RAM). RAM provides relatively fast random access as compared to other random access devices (e.g., disk). RAM is generally readily accessible to a processor executing dedupe processes. RAM is also relatively fast compared to other media. When sub-blocks are stored in RAM, the sub-blocks can be acquired using random accesses that may involve a bus access but no external i/o. Similarly, when information for re-creating a larger item (e.g., file) is stored in RAM, the information can be quickly accessed. Additionally, when the index is stored in RAM, index locations can be accessed using efficient random accesses.

Unfortunately, RAM is currently a finite resource and is also a relatively expensive resource as compared to other media (e.g., SSD, disk). Thus a device performing a de-duplication process likely has access to a finite amount of RAM. Since RAM is finite, neither all the sub-blocks for a dedupe data set, nor the re-creation information, nor the index can be stored completely in RAM. Therefore, at least some sub-blocks, re-creation information, and/or index portions are stored on some media and some device other than RAM. Conventionally, there may have been insufficient attention paid to how sub-blocks, re-creation information, and/or index portions should be arranged on these other storage media and devices. When attention was directed at how dedupe data, re-creation information, and/or index portions should be stored on other media and devices, the attention was typically applied at the generic, theoretical level, rather than at the actual observed data set level.

Disk is one additional storage medium and device used in dedupe. A disk generally includes a spinnable platter(s) with a movable read/write head(s). Disks, like RAM, are generally considered to be random access devices. While both RAM and disk provide random access, disk accesses generally take longer than RAM accesses because the platter(s) needs to be spun to a certain sector and the read/write head(s) need to be positioned over a certain track. Since the spinning and repositioning can be performed within a short enough period of time, the disk is considered to be random access. Thus, sub-blocks, re-creation information, and/or index portions may be available on disk through random accesses, although these random accesses are slower than random accesses to RAM. The disk may also be slower because the disk may not be as directly connected to a processor as RAM. For example, a disk may be connected through a disk controller that provides access to an external device.

Flash memory organized in an SSD is another storage medium used in dedupe. Flash memories tend to be organized using blocks of pages. In some flash-based SSDs, a page may be, for example, from 512 bytes to 16 k bytes and a block may include 8, 16, 32, 64, 128 or other numbers of pages. Flash memories support page reads and page writes rather than reads and writes of individual cells. Pages are written sequentially in a block. Flash memory supports a block erase. A block in a flash memory may have a finite lifetime measured in block erase cycles. For example, a block may only be able to be erased 10,000 times before its performance begins to degrade.

Flash memory supports random page reads but only sequential page writes. A random read from a flash memory has the same speed as a sequential read because there is no head movement required. Therefore, flash memory supports fast random reads but does not support random writes at all. Additionally, flash memory does not support actual in-place updates. Instead, to perform a pseudo-in-place update, a page write would have to be preceded by a block erase. Even then, a number of pages might have to be written sequentially. Conventional SSD supported dedupe may have configured an SSD as, for example, a circular append log. Page sized quantities of key-value pairs are buffered until an entire page is ready to write to the SSD. Conventional SSD supported dedupe may have employed buffering schemes and lookup schemes to avoid random writes to the SSD, to avoid writing less than a full page to SSD, and to avoid having cache misses that could lead to disk i/o. Once again, however, these conventional techniques appear to address theoretical data sets and theoretical devices "after the fact" of dedupe.

FIG. 1 illustrates the logical components 100 and the physical devices 110 described above. A dedupe data set may include an index 102, re-creation information 104, and a sub-block repository 106. These logical components 100 may be arranged in a variety of data structures. For example, an index 102 may be arranged as a linear index, as a binary tree, as an n-ary tree, and in other ways. The data structures are stored on physical devices 110. The physical devices 110 can include, but are not limited to, RAM 112, disk 114, and SSD 116. In different embodiments, the data structures are stored on combinations of the physical devices 110.

FIG. 2 illustrates a flash memory based SSD 200. Pages are organized into blocks. SSD 200 is illustrated with blocks 202, 212, and 222. Block 202 includes pages 204, and 206 through 208. Similarly, block 212 includes pages 214, and 216 through 218 and block 222 includes pages 224, and 226 through 228. SSD 200 supports page reads, page writes, and block erases. The logical components 100 may be stored on SSD 200.

One operation performed by dedupe systems is finding sub-blocks in one data item (e.g., file) that are related to sub-blocks in another data item (e.g., file) so that the duplicate items can be removed, not stored, and/or not transmitted. Finding related (e.g., duplicate, similar) sub-blocks may involve accessing both an index and a repository. As described above, RAM, disk, and SSD may have different strengths and weaknesses and may have different performance characteristics for different operations.

The foregoing statements are not intended to constitute an admission that any patent, publication or other information referred to herein is prior art with respect to this disclosure. Rather, these statements serve to present a general discussion of technology and associated issues in the technology.

BRIEF DESCRIPTION OF THE DRAWINGS

The accompanying drawings, which are incorporated in and constitute a part of the specification, illustrate various example systems, methods, and other example embodiments of various aspects of the invention. The illustrated element boundaries (e.g., boxes, groups of boxes, or other shapes) in the figures represent one example of the boundaries. In some examples one element can be designed as multiple elements or multiple elements can be designed as one element. In some examples, an element shown as an internal component of another element can be implemented as an external component and vice versa. Furthermore, elements may not be drawn to scale.

DETAILED DESCRIPTION

Efficiently and intelligently supporting dedupe using an SSD may involve addressing placement issues. The placement issues may include, but are not limited to, deciding where to put a sub-block, where to put sub-block metadata, and where to put index information associated with a sub-block. When a placement decision includes placing an item on an SSD, the placement issues may also include deciding how to arrange and use the SSD. Resolving the SSD specific placement issues may include considering tradeoffs between items including, but not limited to, data acquisition time, wear, and maximizing the effective capacity of the SSD. Efficiently and intelligently supporting dedupe using an SSD may also include selecting pages to be erased based on reference counts and access frequency information associated with sub-blocks on a page.

As described below, not all de-duplication sub-blocks are created equal. Some de-duplication sub-blocks will be referenced more than other sub-blocks. Therefore, in one embodiment, example methods and devices make placement and/or erasure decisions based, at least in part, on how frequently a sub-block is referenced in a dataset. The placement decisions may concern items including, but not limited to, a de-duplication sub-block repository, a de-duplication index, and de-duplication re-creation information. In one embodiment, the placement decisions may be made at a high level, where placement concerns deciding between media (e.g., RAM, SSD, disk, tape). In one embodiment, the placement decisions may be made at the SSD level, where placement concerns deciding SSD organization, SSD writes, sub-block placement within a page, within a block, and/or within the SSD. Since the placement decisions may be based on how frequently a sub-block is referenced within a dataset, in one embodiment, example methods and devices may pre-de-duplicate a data set to acquire reference count information upon which placement decisions can be made.

Figure 1:
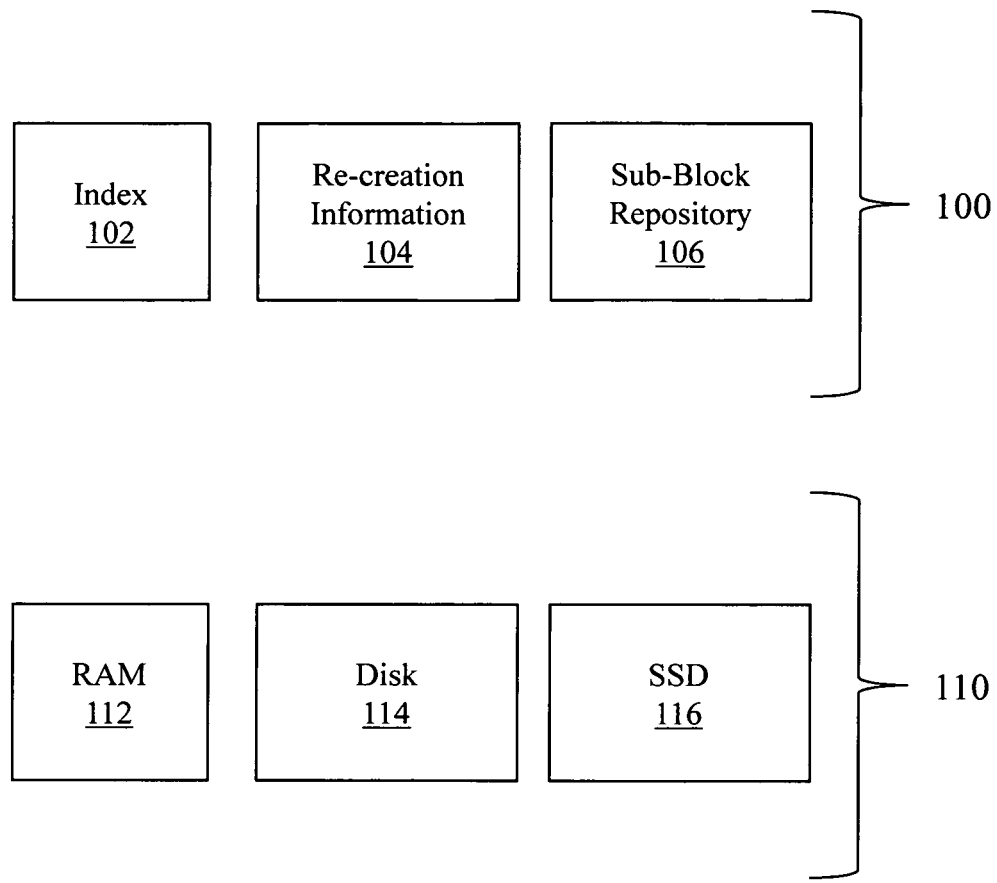
FIG. 1 illustrates logical portions of a de-duplication (dedupe) data set and physical devices that may store the logical portions.
Figure 2:
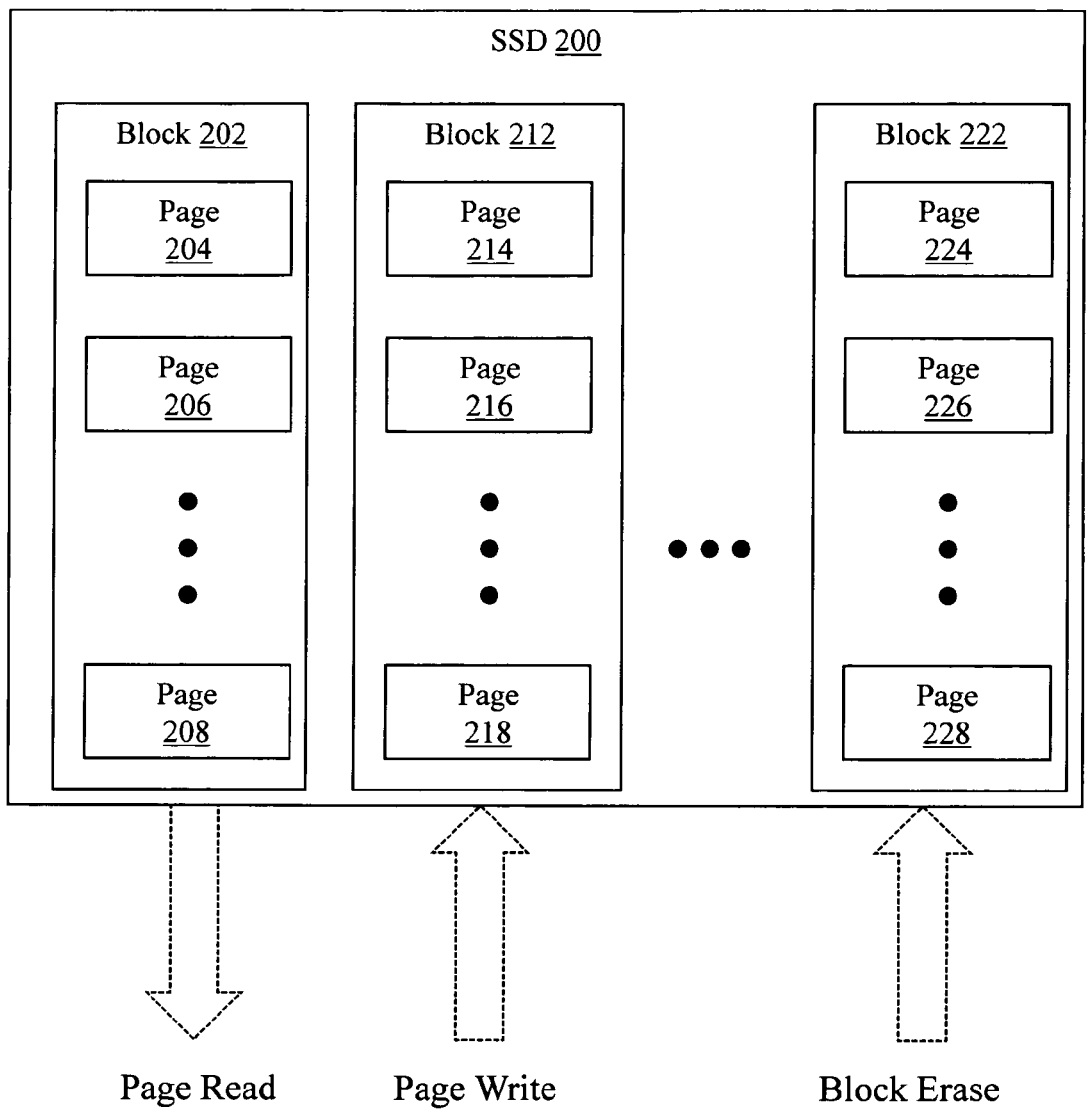
FIG. 2 illustrates an SSD.
Figure 3:
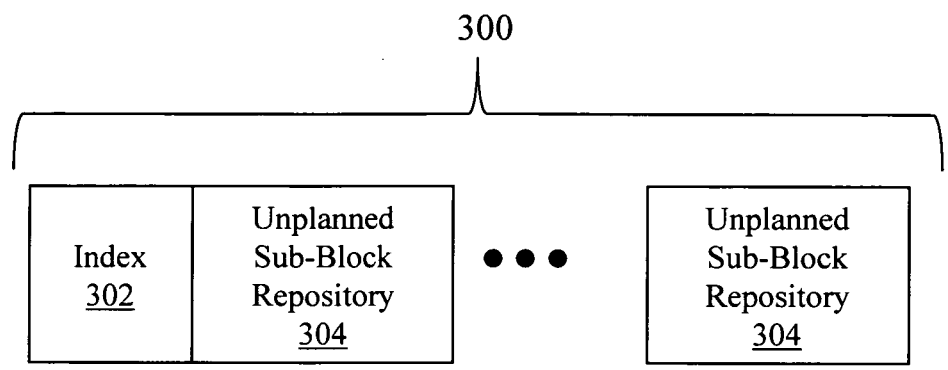
FIG. 3 illustrates an index and unplanned sub-block repository.

In one aspect, de-duplication is concerned with reducing the storage and/or transmission bandwidth requirements for a data set. Initially, some de-duplication approaches assumed that data blocks would likely be substantially equal with respect to their impact on de-duplication. Thus, to the extent that SSDs and other media were used to support conventional dedupe, they may have had an unsophisticated layout that supported an unsophisticated understanding of dedupe data sets similar to that described in FIG. 3. For example, a dataset 300 may have simply had an index 302 placed at the start of the dataset 300 with an unplanned sub-block repository 304. The unplanned sub-block repository 304 may have simply been written in an ad hoc (e.g., as encountered) basis. As the index 302 grew, the operating system or file system or other process may have been relied on to swap portions of the index 302 between RAM and secondary memory (e.g., SSD, disk, tape). Similarly, as the sub-block repository 304 grew, other processes (e.g., operating system, file system) may have been relied on to move and cache sub-blocks that were being processed. While this approach successfully supported dedupe, certain optimizations may have been missed.

Over time, some characteristics of operating de-duplication systems have become apparent. One observation is that not all sub-blocks are equal in their effect on dedupe. This observation is related to the fact that not all sub-blocks are accessed with the same frequency. Some sub-blocks may be more frequently accessed while others are rarely accessed. The observation is also related to the fact that sub-blocks frequently have different reference counts. For example, some sub-blocks are present in many files (e.g., high reference count) while some sub-blocks are present in few files (e.g., low reference count). Additionally, some sub-blocks are unique sub-blocks while other sub-blocks, although technically unique, are actually very similar to other sub-blocks. Some sub-blocks also form the basis for many slightly altered delta sub-blocks. Thus, not all sub-blocks are equal. Therefore, example methods and devices may organize sub-blocks and plan page writes in light of reference counts. Additionally, example methods and device may plan page erasures so that pages with highly referenced and accessed sub-blocks are not inadvertently erased.

Figure 4:
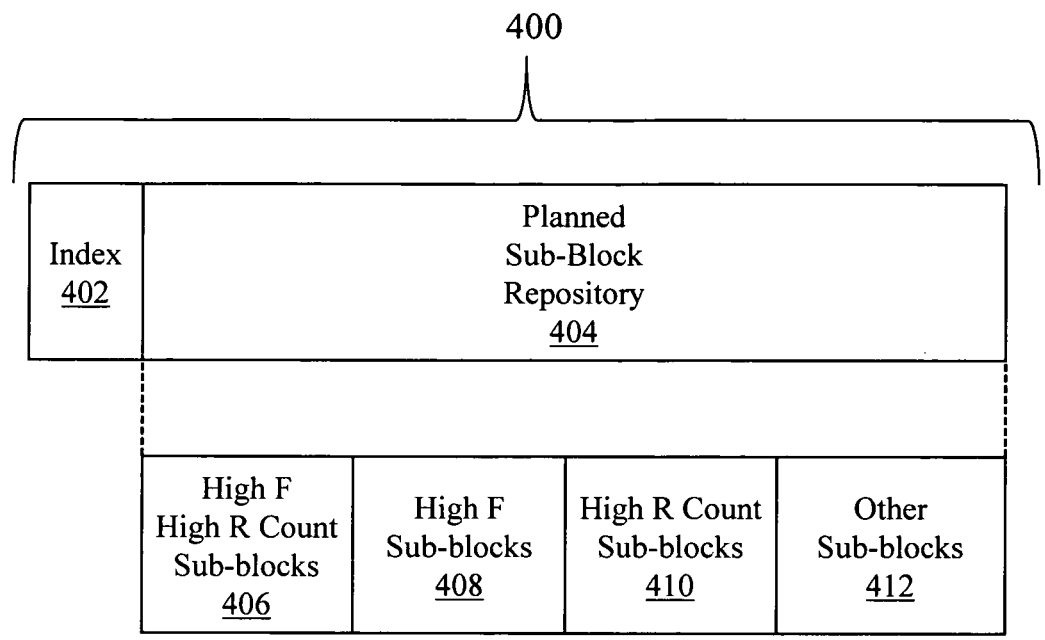
FIG. 4 illustrates an index and a planned sub-block repository.

FIG. 4 illustrates a conceptual difference between placement decisions made by conventional systems and placement decisions made by example methods and devices described herein. Rather than simply producing an unplanned sub-block repository, layout 400 includes an index 402 and a planned sub-block repository 404. In the planned sub-block repository 404, sub-blocks with higher frequency access and with higher reference counts may be placed more carefully than in an ad hoc system. High frequency and/or high reference count sub-blocks may be placed as a function of the observations made about actual dedupe data sets and processes. Thus, sub-blocks may be placed in the sub-block repository 404 according to a plan, rather than in an ad hoc basis. The plan may be based on observations. In one embodiment, the observations may be made by "pre-duping" (pre-de-duplicating) a data set before deciding on a placement strategy. By way of illustration, sub-blocks 406 that are frequently accessed (high f) and that have a high reference count (high R count) may be placed at the start of the repository 404. Then, sub-blocks 408, which have a high F may be placed, followed by sub-blocks 410, which have a high R count. Sub-blocks 412 that qualify as neither high reference count nor high frequency may be placed later in repository 404. While a linear positional relationship is illustrated, being placed "earlier" or "later" may refer to placement in data structures that are easier and/or faster to access. Additionally, being placed "earlier" or "later" may refer to placement on devices that are easier and/or faster to access. Thus, one skilled in the art will appreciate that in one example, placement decisions can include identifying devices, data structures, and relationships between devices and data structures. By way of illustration, index 402 may be placed in RAM and on an SSD, blocks 406, 408, and 410 may be placed on an SSD, and blocks 412 may be placed on disk. Additionally, when a page needs to be moved to disked, erased, or otherwise relocated, pages associated with other sub-blocks 412 may be selected for relocation and/or erasure ahead of sub-blocks 406.

Another observation about actual dedupe data sets and processes concerns how sub-blocks are accessed. Truly random sub-block access is more rare than some conventional systems assumed. Instead of purely random access, sub-blocks tend to be accessed in related groups. For example, when a larger block of data (e.g., a file) has been deduped, depending on how the sub-blocks were stored, it is likely that accessing one sub-block will accurately predict that a related set (e.g., the other sub-blocks for the file) will soon be accessed. Conventional systems may take advantage of these relationships in anticipatory buffering schemes. However, the anticipatory buffering typically performs numerous random accesses to acquire the related subset of sub-blocks. Conventional ad-hoc placement systems may not have placed sub-blocks based on these relationships because the relationships were unknown at the time the data was originally deduped and the sub-blocks were initially written.

Since access patterns may be observable, not random, and thus understandable, in one embodiment, example methods and devices may make placement decisions based, at least in part, on observed patterns. Conventional placement decisions may be made so that most or essentially all sub-blocks in a data set are logically equidistant from an entity that will access the sub-blocks (e.g., process, device). Being logically equidistant may include, for example, traversing an equal number of data structures and/or consuming an equal number of random (e.g., RAM, disk) accesses to be accessed. Seeking logical equidistance may negatively impact optimization available through related access placement. Additionally, seeking logical equidistance may negatively impact the ability to collect high F and/or high R count sub-blocks into SSD pages that are less likely to be erased due to concentrations of high F and/or high R count sub-blocks.

Example methods and devices may make placement and/or erasure decisions based on forensic data accumulated for a data set. This forensic data may also be referred to as second generation data. The second generation data may facilitate locating sub-blocks to take advantage of efficient page-based reads associated with SSD storage. More generally, the forensic data facilitates placing data in and removing data from a storage medium in a manner suited to the constraints of the storage medium and/or storage device. Thus, sub-blocks may be placed not to be logically equidistant as was desired for conceptually random data sets, but rather to take advantage of information about reference counts, frequency of access, and related access.

The second generation data may identify, for example, the order in which sub-blocks are being accessed, groups of sub-blocks being accessed together, the frequency with which sub-blocks are being accessed, reference counts for sub-blocks, which user, process, and/or application is accessing certain sub-blocks, and so on. The forensic data may, therefore, facilitate determining how to position indexes, re-creation information, and/or data sub-blocks to increase dedupe performance. For example, sub-blocks may be located in close proximity to items that reference the sub-blocks.

Example methods and devices may ingest data to a temporary area (e.g., RAM, disk) and then dedupe or partially dedupe the data. Partially deduping the data may include, but is not limited to, identifying unique sub-blocks, identifying sub-block access frequency, identifying sub-block reference counts, identifying duplicate sub-blocks, and identifying related sub-blocks. Forensic data about the ingested and partially deduped data may be acquired and analyzed. Then, a placement decision for this particular data set with its particular forensic characteristics may be designed.

Figure 5:
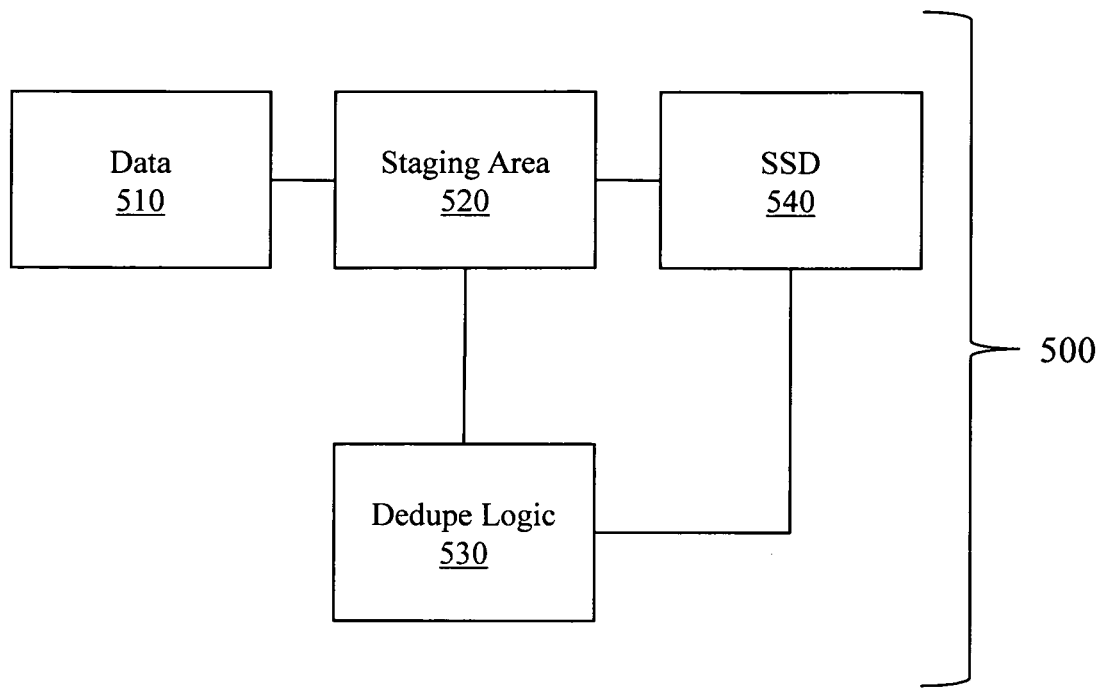
FIG. 5 illustrates a data flow associated with pre-de-duplicating data to acquire placement data upon which a placement decision can be made.

FIG. 5 illustrates a processing flow 500 where data 510 is brought into a staging area 520 for processing by a dedupe logic 530. After the dedupe logic 530 has worked on the data 510 as staged in the staging area 520, the dedupe logic 530 may then make placement and/or erasure decisions. The placement decisions may include, for example, a layout for SSD 540. This differs from conventional data flows where data is deduped as it is received and stored as it is deduped. Instead of deduping "on the fly", example apparatus and methods may do partial dedupe "in place". In one embodiment, only after completing the partial dedupe would example methods and devices decide where to place index, re-creation, and sub-block information. In one embodiment, only after the placement decisions have been made will example methods and devices write out sub-blocks. Deduping in place provides opportunities to acquire forensic data from which placement decisions may be made. Allowing dedupe logic 530 an opportunity to acquire data, statistics, observations, and other information about data 510 while it is being deduped in staging area 520 facilitates making those placement decisions.

The dedupe logic 530 may, for example, identify high reference count sub-blocks and make sub-block placement and/or erasure decisions for SSD 540 based on the number, type, and character of the high reference count sub-blocks. For example, a data set having a large number of high reference count blocks may lead to first placement decisions while a data set having few or even no high reference count blocks may lead to second placement decisions. Additionally, pages associated with high reference count sub-blocks may be less likely to be selected for erasure or movement to another device.

Thus, in one example, placement decisions may be made where sub-blocks are positioned based on their reference count. For example, highest reference count sub-blocks may be positioned to be read first while lowest reference count sub-blocks may be positioned to be read last. Additionally, highest reference count sub-blocks may be positioned so that they would be erased after lowest reference count sub-blocks. In another example, sub-blocks may be positioned based on their relationships. For example, a basis sub-block may be positioned so that it is read before a delta sub-block that depends on the basis sub-block. In yet another example, sub-blocks that tend to be referenced together may be positioned together. In another example, sub-blocks may be positioned based on a combination or weighted combination of factors including, for example, reference count, access frequency, access groups.

In one embodiment, placement decisions for a repository, index, and/or re-creation information may be controlled by relationships between sub-blocks and sub-blocks and/or by relationships between sub-blocks, re-creation information, and an index portion. The information may be acquired from a partial dedupe of a portion of a data set. The partial dedupe of the portion of the data set may be carried out in a staging area. The staging area may have less storage space than the physical devices (e.g., SSD, disk, tape) being used to store the data set. In one example, the staging area will be completely in RAM. In another example, the staging area may be partially in RAM and partially in another storage medium. The staging area may be associated with, for example, a dedupe server, a redupe server, and other hardware apparatus. "Redupe" refers to re-de-duplicating data, which may involve re-organizing a de-duplicated set to be more suited for the storage medium on which it is stored.

Figure 6:
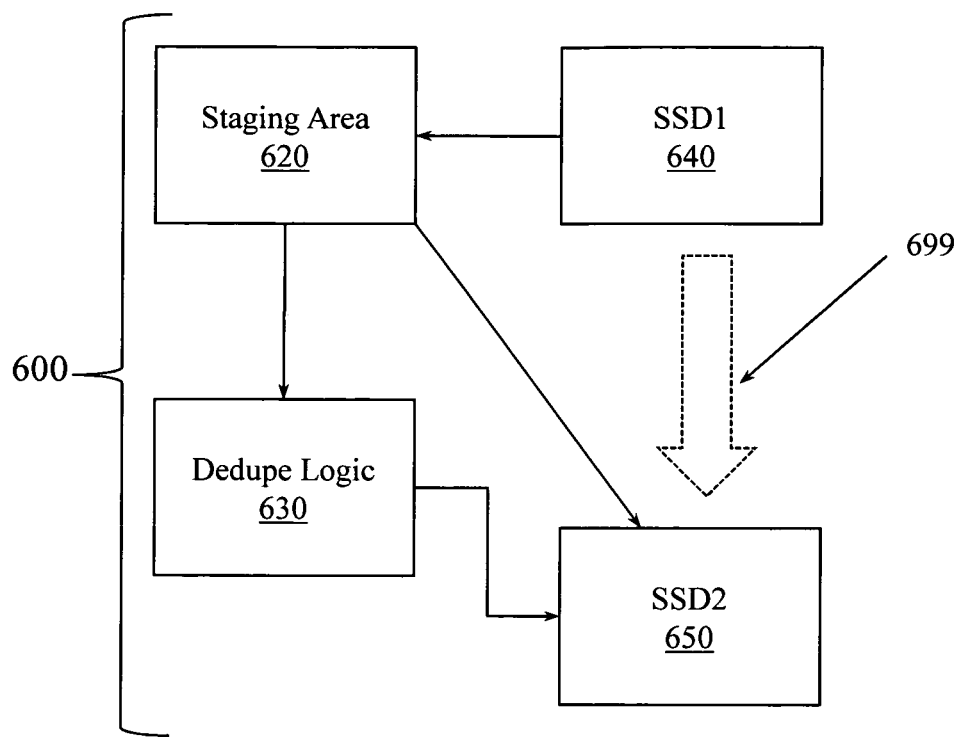
FIG. 6 illustrates re-de-duplicating data to acquire placement data upon which a placement decision can be made.

FIG. 6 illustrates a process flow 600 where data on SSD1 640 is brought into staging area 620 for processing by dedupe logic 630. If the data on SSD1 640 had already been deduped one or more times, then dedupe logic 630 may "redupe" the data and make different placement and/or erasure decisions for SSD2 650 based on the redupe. Logically, while a dedupe data set may appear to move from SSD1 640 to SSD2 650 along flow 699, the data may actually flow through the staging area 620 and dedupe logic 630 before arriving at SSD2 650.

In one embodiment, the partial dedupe or redupe of the portion of the data set may be carried out as an offline process on a replicated data set. For example, a high speed replication may be performed to produce a backup dataset. The backup dataset may then be processed by a redupe server that is not serving live data but that is tasked with optimizing the placement decisions. After one or more redupe sessions, the backup data may be swapped back into the live system. In this way, dedupe optimization may be achieved while dedupe serving continues and the transfer may be seamless.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 7:
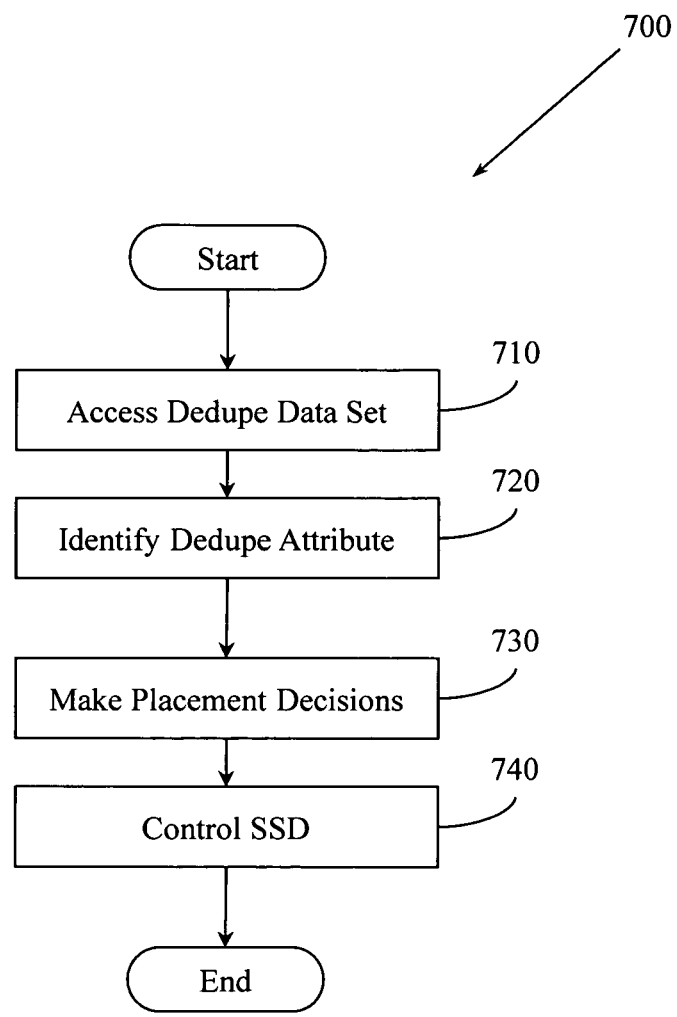
FIG. 7 illustrates a method associated with SSD supported de-duplication.

FIG. 7 illustrates a method 700 associated with making placement decisions for SSD supported dedupe. Method 700 includes, at 710, accessing a de-duplication data set. The de-duplication data set may include items including, but not limited to, a set of sub-blocks produced by a de-duplication process, an index produced by the de-duplication process, and re-creation information produced by the de-duplication process. The index may store index entries related to members of the set of sub-blocks and the re-creation information may store data for re-creating a larger data block from two or more sub-blocks in the set of sub-blocks.

In one example, the set of sub-blocks may have been parsed into sub-blocks by the de-duplication process but may not have had duplicate sub-blocks removed. In another example, the set of sub-blocks may have had at least one duplicate removed by the de-duplication process. Thus, method 700 may process dedupe data sets that are at different stages of maturity in the dedupe process.

In one example, accessing the de-duplication data set may include controlling a dedupe apparatus to read the data from an SSD drive. In another example, accessing the de-duplication data set may include controlling another storage device (e.g., disk, memory) to provide the dedupe data set.

In one example, accessing the de-duplication data set may include controlling a device to ingest the set of sub-blocks into a temporary de-duplication work area. The temporary de-duplication work area may be located in RAM associated with the computer executing the method. The size of the temporary de-duplication work area may be less than the size of the SSD for which placement decisions are being made. Thus, a complete data set may be read into the temporary de-duplication work area one subset at a time. Dedupe information may be acquired by analyzing the data that is "parked" in the temporary dedupe work area.

Method 700 also includes, at 720, identifying a de-duplication attribute associated with the de-duplication data set. In different examples, the de-duplication attribute may be related to facts including, but not limited to, a sub-block reference count, a sub-block access order, a sub-block access frequency, a sub-block access group relationship, a sub-block basis/delta relationship, a sub-block accessing entity identity, an indexing parameter, and a re-creation information parameter. This data may be acquired without actually deduping (e.g., removing any sub-blocks) the data set while it resides in the temporary dedupe work area.

As described above, the data set may be at different levels of maturity in the dedupe process. For example, it may have been partially deduped, it may have been deduped once, or it may have been deduped several times and used as live data for an extended period of time. Therefore, identifying the de-duplication attribute may be performed as part of processes including, but not limited to, a partial de-duplication of the set of sub-blocks, a re-de-duplication of the set of sub-blocks, and a complete de-duplication of the set of sub-blocks. In one embodiment, the dedupe attribute may be acquired without removing, replacing, or even reworking any sub-blocks but rather may be acquired by analyzing the already deduped data set. It may be desirable to work on replicated data rather than on live data while (re)making placement decisions. Therefore, in different examples, the partial de-duplication of the set of sub-blocks, the re-de-duplication of the set of sub-blocks, or the complete de-duplication of the set of sub-blocks may be performed on replicated data.

Method 700 also includes, at 730, making placement decisions for at least a portion of the de-duplication data set based, at least in part, on the de-duplication attribute. The placement decisions may identify items including, but not limited to, a device for a sub-block, a sub-block position on an SSD, a device for a portion of an index, a position for a portion of an index on an SSD, a device for re-creation information, a location on an SSD for re-creation information, and an erasure order for sub-blocks.

Making placement decisions may involve partitioning larger data structures into multiple smaller data structures. Therefore, in one example, making placement decisions may include partitioning a portion of the index into at least two indexes and determining different devices and SSD locations for the at least two indexes. Similarly, making placement decisions may include partitioning a portion of the re-creation information into at least two portions of re-creation information and determining different devices and SSD locations for the at least two portions of re-creation information. Likewise, making the placement decisions may include partitioning the set of sub-blocks into at least two subsets of sub-blocks and determining different devices, SSD locations for the at least two subsets of sub-blocks, and an erasure order. Different embodiments may include different combinations of partitioning an index, partitioning re-creation information, and partitioning subsets of sub-blocks.

When a larger index is split into smaller indexes, making the placement decisions may also cause re-indexing of sub-blocks in the set of sub-blocks to account for the at least two indexes. In one embodiment, an index entry in one of the at least two indexes is smaller than an index entry in the original, larger index. In this way, space may be saved as compared to conventional systems.

Method 700 also includes, at 740, causing at least a portion of the de-duplication data set to be written to an SSD as controlled by at least one of the placement decisions. In one embodiment, SSD pages may be written according to placement decisions that make it more likely that index portions and sub-blocks indexed by the index portions will be read into RAM together. For example, an SSD page may include index information, sub-block metadata, a sub-block(s), and combinations thereof. In another embodiment, SSD pages that store index information may be written, then SSD pages that store sub-block metadata for the just written index information may be written, and then SSD pages that store sub-blocks described by the sub-block metadata may be written. In one embodiment, placement decisions including, but not limited to, SSD page layout, SSD block layout, SSD page contents, and SSD page write order may be controlled by one or more of, reference counts, and access frequency.

Writing information to an SSD may involve erasing other information from an SSD. Therefore, in one embodiment, an SSD page or block to be erased may be selected based on reference count information associated with sub-blocks related to the SSD page or block. For example, if an SSD page is related to a large number of high reference count sub-blocks then that SSD page may be less likely to be selected for being erased and written than an SSD page related to a smaller number of high reference count sub-blocks and much less likely to be selected than an SSD page that is only related to single-reference sub-blocks. Thus, in one embodiment, SSD pages and/or blocks may be selected to be erased based on reference count information. In another embodiment, SSD pages and/or blocks may be selected to be erased based on frequency count information. In yet another embodiment, SSD pages and/or blocks may be selected to be erased based on a weighted function that considers frequency count information and reference count information. Controlling which SSD pages are erased facilitates extending SSD lifetime.

Figure 8:
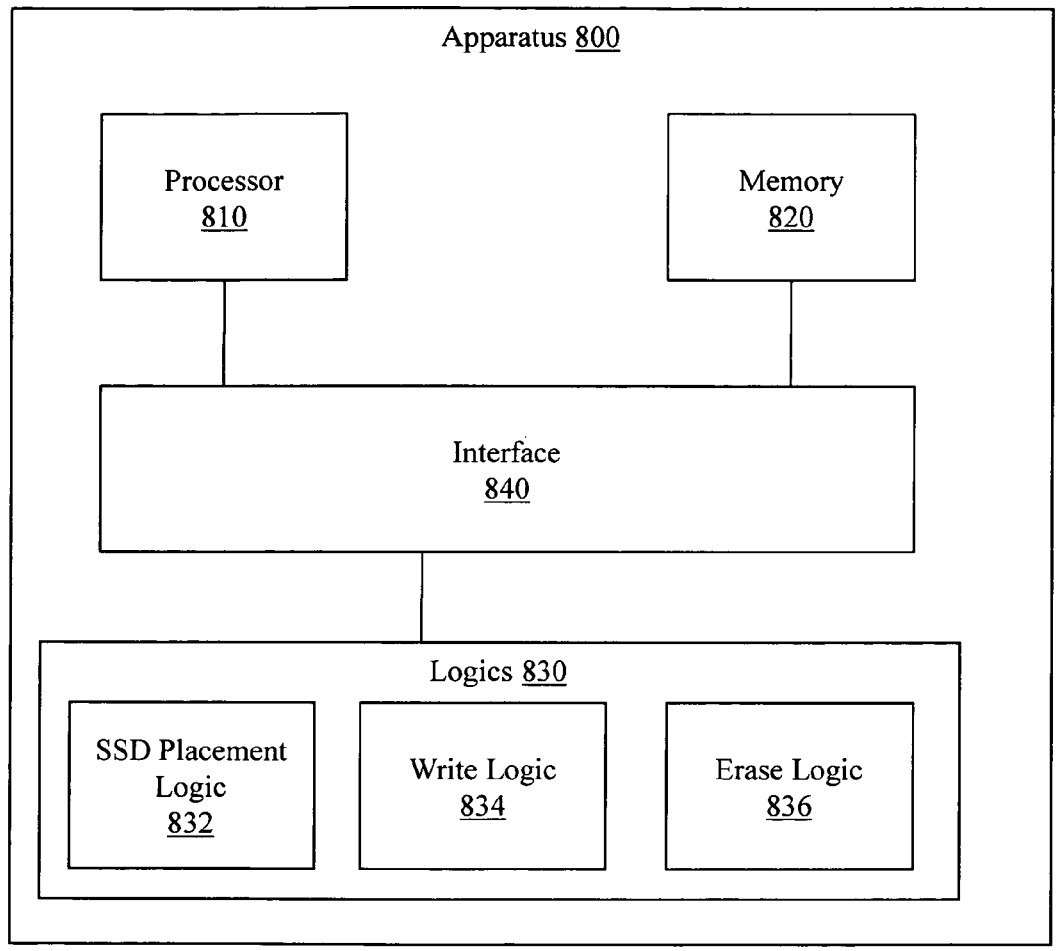
FIG. 8 illustrates an apparatus configured to provide SSD support to de-duplication.

FIG. 8 illustrates an apparatus 800 that is configured to perform processing associated with SSD supported de-duplication. Apparatus 800 includes a processor 810, a memory 820, a set of logics 830 and an interface 840 that is configured to connect the processor 810, the memory 820, and the set of logics 830.

The set of logics 830 may include an SSD placement logic 832 and a write logic 834. The SSD placement logic 832 may be configured to make placement decisions for a de-duplication data set based on forensic data acquired for the de-duplication data set. In one example, the SSD placement logic 832 is configured to make the placement decisions based on factors revealed in the forensic data. The factors can include, but are not limited to, observed de-duplication operation data, SSD capacity, SSD configuration (e.g., page size, block size), and observed de-duplication processing parameters. The observed de-duplication operation data may identify items including, but not limited to, a sub-block reference count, a sub-block access order, a sub-block access frequency, a sub-block access group relationship, a sub-block basis/delta relationship, a sub-block accessing entity identity, an indexing parameter, and a re-creation information parameter. The observed de-duplication processing parameters can include, but are not limited to, a de-duplication pre-fetch scheme, a de-duplication buffering scheme, and a de-duplication apparatus buffering capacity. In one embodiment, memory 820 can include a temporary dedupe area into which data can be read to be analyzed by SSD placement logic 832. SSD placement logic 832 may then perform dedupe related activities on the temporarily stored data and, in one example, do so without removing any sub-blocks at that time. Thus, SSD placement logic 832 may "pre-dupe" (pre-de-duplicate) and/or "re-dupe" (re-de-duplicate) data that has been temporarily stored in order to acquire data upon which placement decisions can be made.

The write logic 834 may be configured to write portions of the de-duplication data set to an SSD according to the placement decisions. In one example, the placement decisions can control attributes including, but not limited to, a device for an index partition, a location on an SSD for an index partition, a device for re-creation information, a location on an SSD for re-creation information, a device for sub-blocks, and locations for sub-blocks on an SSD.

Apparatus 800 may also include an erase logic 836. Erase logic 836 may be configured to control erasing SSD pages and blocks before writing information to an SSD. Erase logic 836 may select an SSD page or block to be erased based on reference count information associated with sub-blocks related to the SSD page or block. Erase logic 836 may be configured to select pages and/or blocks to be erased using one or more of, a lowest reference count approach, a lowest frequency access approach, and a combined approach.

While example devices, apparatus, systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B), the term "or" is intended to mean "A or B or both". The phrase "only A or B but not both" indicates that "only A or B but not both" is to be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer control the computer to perform a method, the method comprising:
    accessing a de-duplication data set, where the de-duplication data set includes one or more of, a set of sub-blocks produced by a de-duplication process, an index produced by the de-duplication process, the index storing index entries related to members of the set of sub-blocks, and re-creation information produced by the de-duplication process, the re-creation information storing data for re-creating a larger data block from two or more sub-blocks in the set of sub-blocks;
    identifying a de-duplication attribute associated with the de-duplication data set;
    determining a placement data for at least a portion of the de-duplication data set based, at least in part, on the de-duplication attribute; and
    controlling the writing of at least a portion of the de-duplication data set to a flash memory based solid state drive (SSD) as a function of the placement data.

2. The computer-readable medium of claim 1, where the placement data identifies one or more of, where to write a sub-block on the SSD based on a reference count associated with the sub-block, and where to write a sub-block on the SSD based on an access frequency associated with the sub-block.

3. The computer-readable medium of claim 1, where the placement data identifies an SSD page erasure controlling attribute for a sub-block on the SSD based on a reference count associated with the sub-block.

4. The computer-readable medium of claim 1, where the set of sub-blocks has been parsed into sub-blocks by the de-duplication process but has not had duplicate sub-blocks removed.

5. The computer-readable medium of claim 1, where the set of sub-blocks has had at least one duplicate removed by the de-duplication process.

6. The computer-readable medium of claim 1, where the de-duplication attribute is related to one or more of, a sub-block reference count, a sub-block access order, a sub-block access frequency, a sub-block access group relationship, a sub-block basis/delta relationship, a sub-block accessing entity identity, an indexing parameter, and a re-creation information parameter.

7. The computer-readable medium of claim 1, where accessing the de-duplication data set comprises ingesting the set of sub-blocks into a temporary de-duplication work area, where the temporary de-duplication work area is located in random access memory associated with the computer executing the method, and where the size of the temporary de-duplication work area is less than the size of the SSD.

8. The computer-readable medium of claim 7, where identifying the de-duplication attribute is performed by analyzing the set of sub-blocks in the temporary de-duplication work area.

9. The computer-readable medium of claim 8, where the set of sub-blocks are analyzed in the temporary de-duplication work area before sub-blocks are written to the first SSD as controlled, at least in part, by the placement data.

10. The computer-readable medium of claim 1, where identifying the de-duplication attribute is performed as part of one or more of, a pre-de-duplication of the set of sub-blocks, a partial de-duplication of the set of sub-blocks, a re-de-duplication of the set of sub-blocks, and a complete de-duplication of the set of sub-blocks.

11. The computer-readable medium of claim 10, where one or more of, the pre-de-duplication of the set of sub-blocks, the partial de-duplication of the set of sub-blocks, the re-de-duplication of the set of sub-blocks, and the complete de-duplication of the set of sub-blocks is performed on replicated data.

12. The computer-readable medium of claim 1, where the placement data identifies one or more of, a device on which a sub-block is to be stored, a location to store the sub-block on the device on which the sub-block is to be stored, a device on which a portion of an index is to be stored, a location to store the portion of the index on the device on which the portion of the index is to be stored, a device on which re-creation information is to be stored, a location to store the re-creation information on the device on which the re-creation information is to be stored, and an erasure order for pages on an SSD.

13. The computer-readable medium of claim 1, the method comprising determining the placement data based additionally on a buffer scheme associated with a de-duplication apparatus that will access the de-duplication data set.

14. The computer-readable medium of claim 1, where the placement data identifies how to locate on a single page of the SSD a portion of the index and a sub-block indexed by the portion of the index.

15. The computer-readable medium of claim 1, where determining the placement data comprises partitioning a portion of the index into at least two indexes and determining different locations on the SSD for the at least two indexes.

16. The computer-readable medium of claim of claim 15, comprising re-indexing sub-blocks in the set of sub-blocks as a function of the at least two indexes.

17. The computer-readable medium of claim 16, where an index entry in one of the at least two indexes is smaller than an index entry in the index.

18. The computer-readable medium of claim 1, where determining the placement data comprises partitioning the set of sub-blocks into at least two subsets of sub-blocks, determining different locations on the SSD for the at least two subsets of sub-blocks, and determining an erasure order the at least two subsets.

19. The computer-readable medium of claim 1, where determining the placement data comprises selecting an SSD page to be erased as a function of one or more of, a reference count associated with a sub-block associated with the SSD page, and an access frequency associated with a sub-block associated with the SSD page.

20. The computer-readable medium of claim 1,
where the de-duplication data set comprises a portion of a first logical partition of a previous de-duplication data set previously written to a previous SSD according to a previous placement data and a portion of a second logical partition of the previous de-duplication data set written to the previous SSD according to the previous placement data.

21. An apparatus, comprising:
a processor;
a memory;
a set of logics; and
an interface to connect the processor, the memory, and the set of logics,
the set of logics comprising:
an SSD placement logic configured to determine placement information for a de-duplication data set based on forensic data acquired for the de-duplication data set; and
a write logic configured to write at least a portion of the de-duplication data set to an SSD according to the placement information.

22. The apparatus of claim 21, where the SSD placement logic is configured to determine the placement information based on one or more of, observed de-duplication operation data, SSD capacity, SSD configuration, and observed de-duplication processing parameters.

23. The apparatus of claim 22, where the observed de-duplication operation data identifies one or more of, a sub-block reference count, a sub-block access order, a sub-block access frequency, a sub-block access group relationship, a sub-block basis/delta relationship, a sub-block accessing entity identity, an indexing parameter, and a re-creation information parameter.

24. The apparatus of claim 23, where the observed de-duplication processing parameters include one or more of, a de-duplication pre-fetch scheme, a de-duplication buffering scheme, and a de-duplication apparatus buffering capacity.

25. The apparatus of claim 21, where the placement information controls one or more of, a device on which a sub-block is to be stored, a location to store the sub-block on the device on which the sub-block is to be stored, a device on which a portion of an index is to be stored, a location to store the portion of the index on the device on which the portion of the index is to be stored, a device on which re-creation information is to be stored, and a location to store the re-creation information on the device on which the re-creation information is to be stored.

26. The apparatus of claim 21, where the SSD placement logic is configured to position portions of the de-duplication data set in the memory and to control the processor to generate the forensic data in response to analyzing the de-duplication data set in the memory as the de-duplication data set is at least partially de-duplicated in place.

27. The apparatus of claim 21, comprising an erase logic configured to select a page on the SSD to be erased based on one or more of, reference count information associated with a sub-block related to the page on the SSD, and access frequency information associated with a sub-block related to the page on the SSD.

28. The apparatus of claim 27, where the erase logic is configured to select the page on the SSD using one or more of, a lowest reference count approach, a lowest frequency access approach, and a combined reference count and frequency access approach.

29. A system, comprising:
means for controlling a flash memory based solid state device to select a page to be erased based on a de-duplication reference count associated with a sub-block stored on the page.

* * * * *

UNITED STATES PATENT AND TRADEMARK OFFICE
CERTIFICATE OF CORRECTION

PATENT NO. : 8,572,312 B2  Page 1 of 1
APPLICATION NO. : 13/373975
DATED : October 29, 2013
INVENTOR(S) : Jeffrey Tofano It is certified that error appears in the above-identified patent and that said Letters Patent is hereby corrected as shown below:

In the Specification:

In column 7, line 41, delete "access groups" and replace with --and access groups--.

In the Claims:

Claim 16, column 12, line 65, delete "medium of claim of claim 15" and replace with --medium of claim 15--.

Claim 18, column 13, line 8, delete "order the" and replace with --order for the--.

Signed and Sealed this
Eleventh Day of March, 2014

Michelle K. Lee
*Deputy Director of the United States Patent and Trademark Office*